United States Patent [19]

Lui

[11] Patent Number: 5,532,751
[45] Date of Patent: Jul. 2, 1996

[54] EDGE-BASED INTERLACED TO PROGRESSIVE VIDEO CONVERSION SYSTEM

[76] Inventor: Sam Lui, 2680 Fayette Dr., Apt. 617, Mountain View, Calif. 94040

[21] Appl. No.: 509,075

[22] Filed: Jul. 31, 1995

[51] Int. Cl.[6] ................................................ H04N 7/01
[52] U.S. Cl. ........................ 348/452; 348/700; 348/448
[58] Field of Search .................................. 348/448, 409, 348/458, 452, 451, 446, 441, 431, 699, 700; H04N 7/01, 11/02

[56] References Cited

U.S. PATENT DOCUMENTS

| | | | |
|---|---|---|---|
| 4,937,667 | 6/1990 | Choquet et al. | 348/448 |
| 4,941,045 | 7/1990 | Birch | 348/448 |
| 4,985,764 | 1/1991 | Sato | 348/448 |
| 5,019,903 | 5/1991 | Dougall | 348/448 |
| 5,093,721 | 3/1992 | Rabii | 348/448 |
| 5,339,109 | 8/1994 | Hong | 348/448 |
| 5,428,397 | 6/1995 | Lee et al. | 348/448 |

Primary Examiner—Safet Metjahic
Assistant Examiner—Michael H. Lee

[57] ABSTRACT

The present invention provides a video conversion system for converting interlaced images to progressive images which produces high quality images without high computational and buffer costs. The deinterlacing video conversion system described by the present invention decreases computation complexity by utilizing the edge information of the pixel of the reference field to perform three processing tasks: (1) testing for the presence of local inter-field motion, (2) computing the pixel value for directional interpolation, and (3) determining the value of the pixel in the auxiliary field. Further, the video conversion process described is able to detect inter-field motion using only two field buffers, thereby decreasing system costs.

20 Claims, 6 Drawing Sheets

EDGE-BASED INTERLACED TO PROGRESSIVE VIDEO CONVERSION SYSTEM

BACKGROUND OF THE INVENTION

The present invention relates generally to video systems and more particularly to a video conversion system for converting interlaced images to progressive images.

Figure 1:
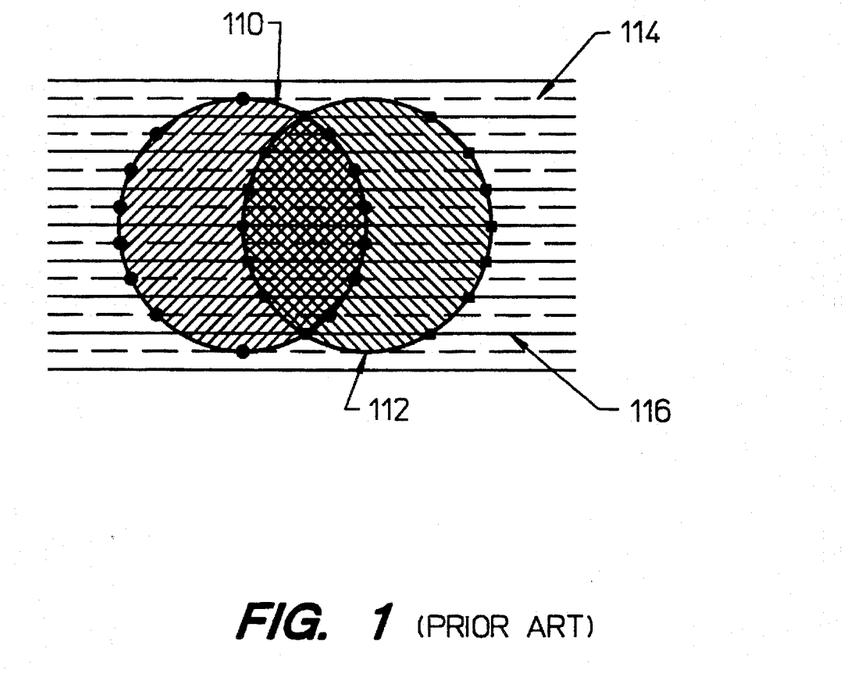
FIG. 1 shows a representation of a video frame including a moving object that is interlaced scanned.

Currently the majority of video signals are formatted according to the National Television Standard Committee (NTSC) standard. A NTSC video frame typically consists of two fields, each field containing alternating frame lines. The two fields are scanned independently 1/60 seconds apart and interlaced to produce a video frame. Referring to FIG. 1, shows a moving object at a position 110 representative of an object in field 1 scanned in at time $t_1$. Position 112 is representative of the same object in field 2 scanned in at time $t_2$.

Figure 2:
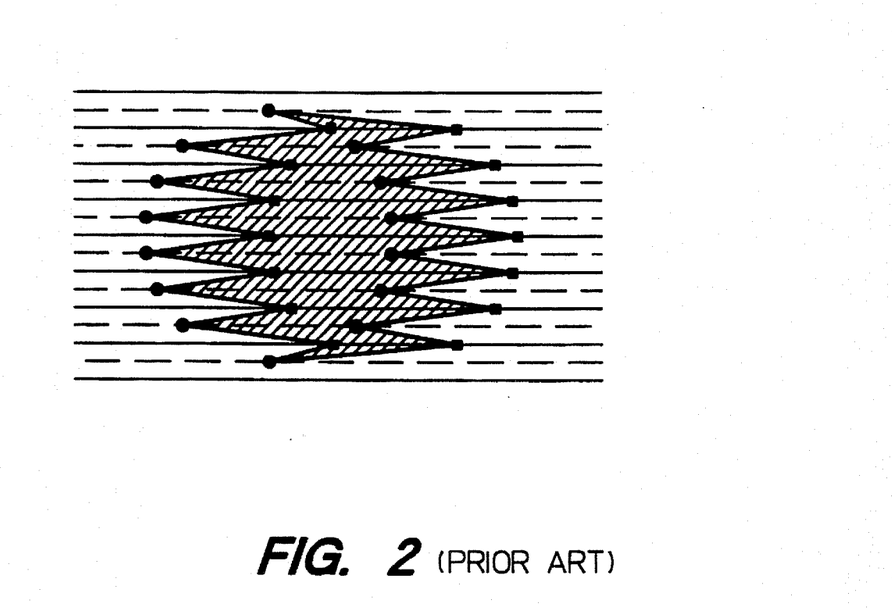
FIG. 2 shows a representation of a video output frame where the first and second interlaced scanned fields are stored in a non-interlaced progressive format.

NTSC standard video signals, which are interlace scanned to reduce the signal bandwidth, provides satisfactory motion rendition. The interlaced video format, however, is not well suited for a number of applications related to video compression and still-image hardcopy and display. For example, video compression algorithms such as MPEG-1 assume the video input to be progressive which decreases the coded image quality of interlaced videos. As for still image hardcopy and display, interlaced images introduce visually annoying artifacts that appear as serrated edges in motion regions. Referring to FIG. 2 shows a representation of the moving object of FIG. 1 stored in a non-interlaced progressive format. The motion which occurs between the scanning of object between field 1 and field 2 of the video frame results in the serrated edges shown in FIG. 2.

Converting interlaced video sequences to progressive format, simply known as deinterlacing, is an important technique for processing digital videos from NTSC sources. Deinterlacing algorithms that convert interlaced sequences to progressive sequences typically follow two approaches. The first approach uses information from only one of the fields and interpolates the video input information to full frame. Although this approach typically only requires two field buffers it does not detect inter-field motion and typically results in blurring of the video image since half of the video input information is discarded. The second deinterlacing approach uses information from both fields to construct the progressive frame. Although this approach has the potential of producing a better image quality, it is at the expense of increased computational complexity and/or increased buffer requirements as this approach typically requires using three field buffers.

A video conversion system for converting interlaced images to progressive images which produces high quality images without high computational complexity and/or buffer requirements is needed.

SUMMARY OF THE INVENTION

The present invention provides a video conversion system for converting interlaced images to progressive images which produces high quality images without high computational and buffer costs. The deinterlacing video conversion system described by the present invention decreases computation complexity by utilizing the edge information of the pixel of the reference field to perform three processing tasks: (1) testing for the presence of local inter-field motion, (2) computing the pixel value for directional interpolation, and (3) determining the value of the pixel in the auxiliary field. Further, the video conversion process described is able to detect inter-field motion using only two field buffers, thereby decreasing system costs.

The deinterlacing video conversion system converts the video frame from interlaced to progressive format using edge information. The video frame is typically comprised of two fields, a reference field and an auxiliary field. At a first level, the video field is tested for interfield motion. For each pixel in the auxiliary field, if no inter-field motion is found, the pixel in the auxiliary field is unchanged. If inter-field motion is detected, the value of the pixel in the auxiliary field is replaced by a predicted value.

Other aspects and advantages of the present invention will become apparent from the following detailed description, which, when taken in conjunction with the accompanying drawings, illustrates by way of example, the principles of the invention.

DETAILED DESCRIPTION OF THE PREFERRED EMBODIMENTS

Figure 3:
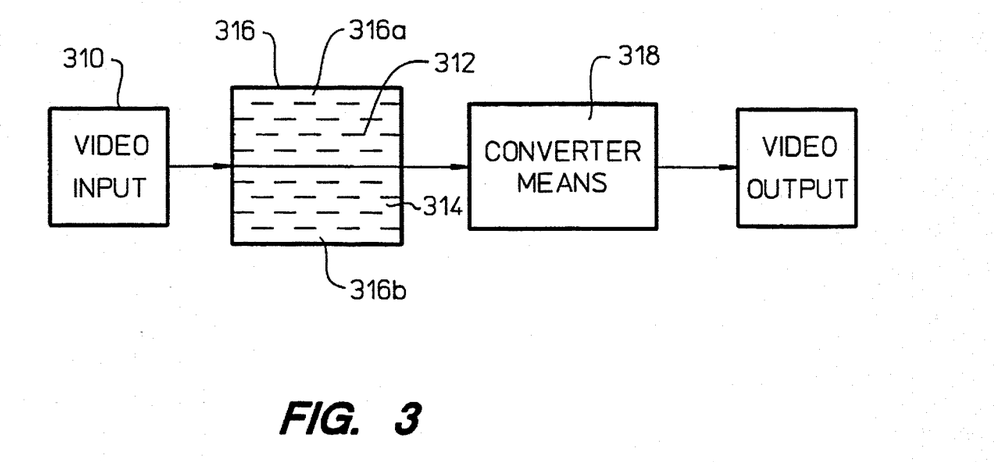
FIG. 3 shows a block diagram of the video conversion system according to the present invention.

FIG. 3 shows a block diagram of the video conversion system according to the present invention. The video input 310 is typically comprised of a first field 312 and a second field 314. In the following description, the first field 312 is designated as the reference field and the second field 314 is designated as the auxiliary field. However, alternatively the reference field can be defined as the second field and the auxiliary field may be defined as the first field.

Referring to FIG. 3, the video input 310 is typically stored in a first field buffer 316a and a second field buffer 316b. The first and second field buffers 316a, 316b are typically RAM memory. The data stored in the first and second field buffers 316a, 316b is input into a converter means 318 which utilizes the process shown in FIG. 4 to interpolate the interlaced video input 310 into a video output 320 that is in a progressive format.

Figure 4:
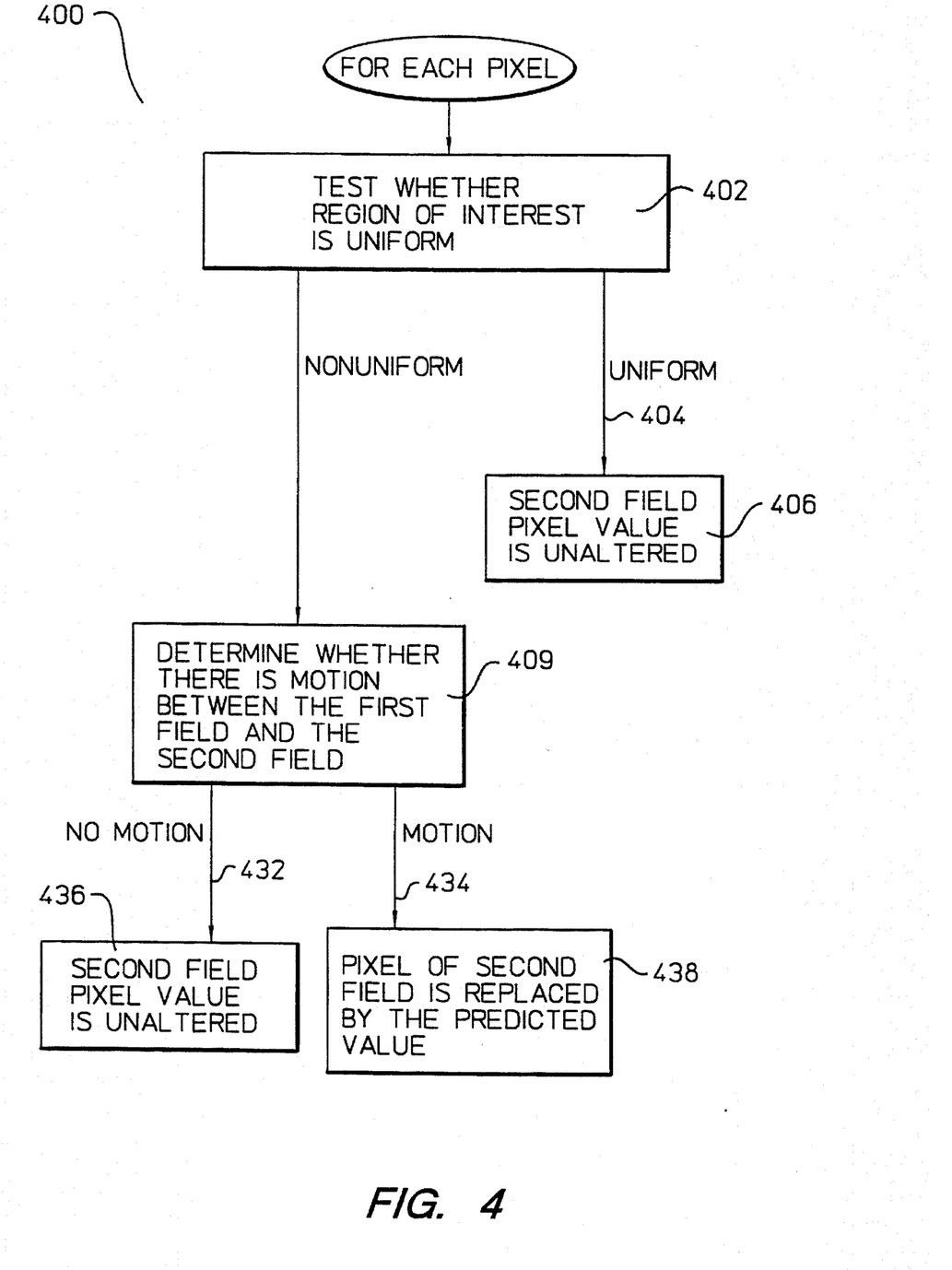
FIG. 4 shows a flow chart of the steps for converting an interlaced scanned video input to a progressive format according to the preferred embodiment of the present invention.

FIG. 4 shows a flow chart of the steps for converting a interlaced scanned video input to a progressive format according to the present invention. Based on the pixel values of the reference field 312, the video conversion process modifies the pixel values of the auxiliary field 314 to appear as if the resulting frame is progressively scanned. Referring to steps of the process shown in FIG. 4, the deinterlacing process operates on a pixel-by-pixel basis. Thus for the video conversion process described, for each pixel location in the image which is required to be converted from interlace scanned to progressive format, the pixel location in the reference field 312 is compared to the corresponding pixel location in the auxiliary field 314.

Figure 5:
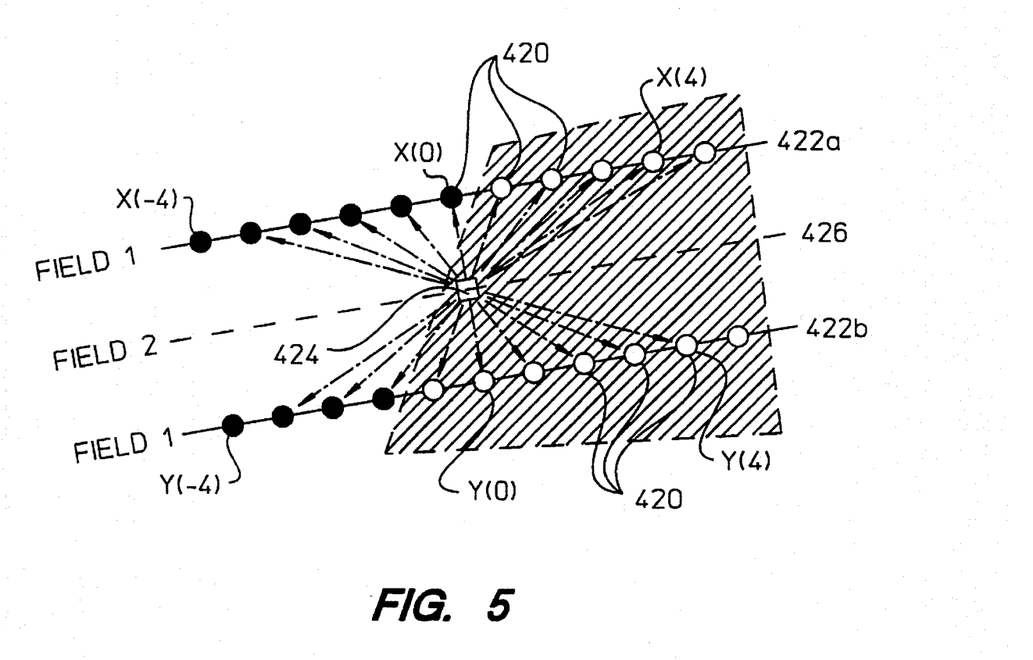
FIG. 5 shows a representation of a pixel of interest in the second field and the corresponding pixels in the second field used when finding the edge orientation of the pixel of interest.

The first step 402 in the video conversion process 400, is testing the region for uniformity. If the pixel value in the region of interest is uniform, then the pixel value in the second field is unaltered. FIG. 5 shows a representation of pixels 420 along a first scan line 422 and a pixel of interest 424 along a second scan line 426. Lines 422a and 422b are representative of the scan lines for the reference field (the first field). The circles along scan lines 422 are representative of pixels 420 located along the scan lines 422a and 422b. Line 426 is representative of a scan line for the auxiliary field (the second field). The square 424 is representative of the pixel of interest in the second field.

The pixels along scan lines have a location, indicated by the value within the parentheses, and a value, indicated by the color of the pixel. The value of each pixel is typically represented by a value between 0 and 255. For purposes of discussion, assume the darkened pixels in locations x(−4) through x(0) and locations y(−4) through y(−2) have a value of 0. Further assume the light pixels in locations x(1) through x(4) and y(−1) through y(4) have a value of 100. Thus, for example, the value of the pixel at location x(−4) is 0 while the value of the pixel at location x(1) is 100.

For purposes of example, let's assume the region of interest for pixel 424 includes the pixels in the first field directly above pixel 424, in this case pixel x(0) and the pixel in the first field directly below pixel 424, in this case pixel y(0). Although other means of testing uniformity are available, typically uniformity is tested by comparing the value of the pixel of interest P(0) to the value of the pixels in the region of interest, in this case the vertically aligned pairs x(0) and y(0). In the present case, the absolute value of difference between pixel x(0) and pixel P(0) is added to the absolute value of the difference between pixel P(0) and y(0). If the sum of these two values is less than a threshold value, then the region of interest is judged to be uniform. Thus if (|x(0)−P(0)|+|P(0)−y(0)|)< threshold value, then the region at interest is considered uniform. The value of the predetermined threshold value varies dependent on the system requirements. In the present embodiment, the value of the predetermined threshold is set at 20.

Figure 6:
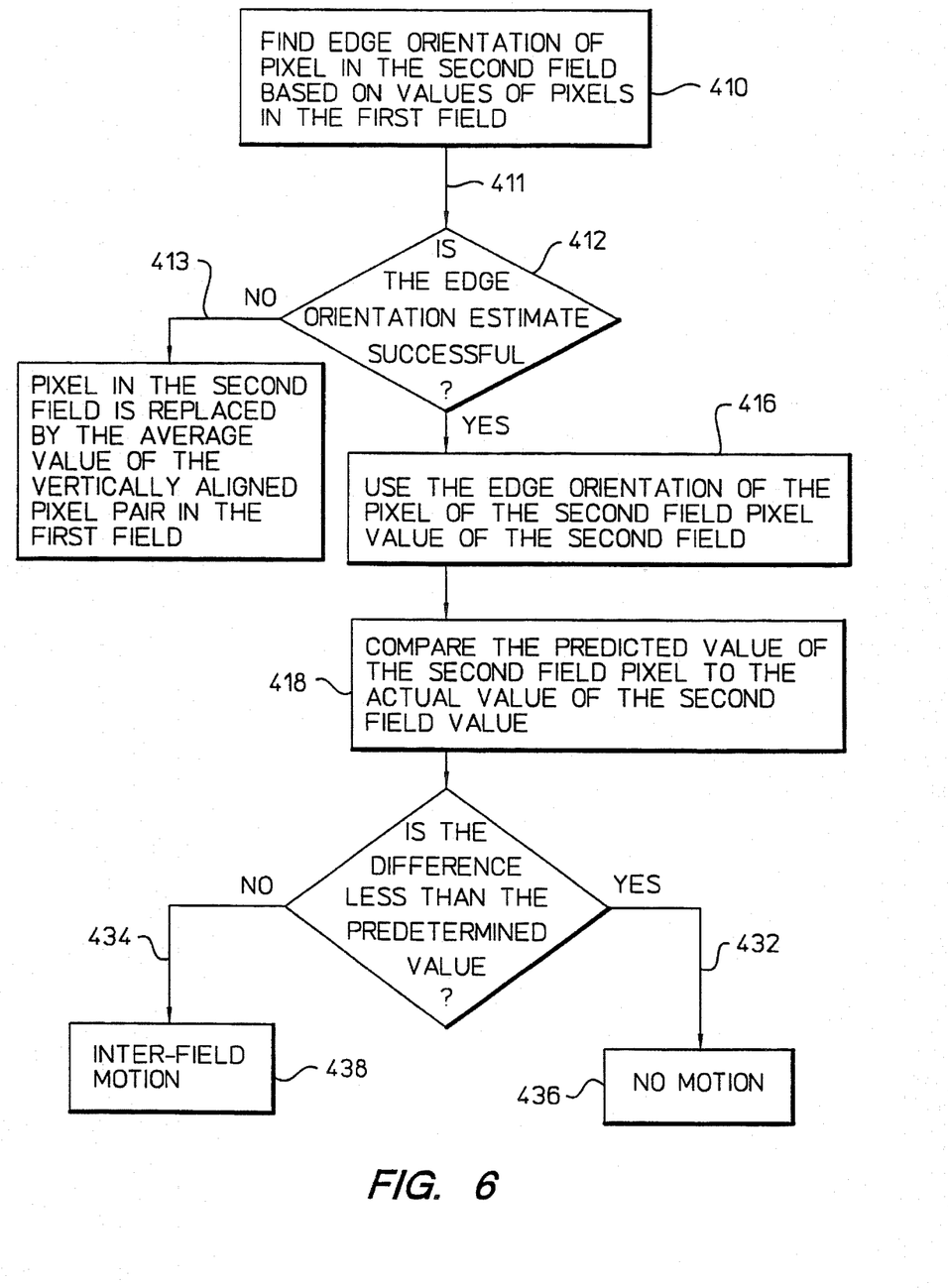
FIG. 6 shows a representation of one method for determining whether there is motion between a first field and a second field for a pixel of interest.

Referring to FIG. 4, if the region of interest is uniform 404, then the value of the pixel in the second field is not changed 406. If the region of interest is not uniform, the next step 409 in the video conversion process is determining for a pixel of interest whether motion occurs between the first field 312 and the second field 314. Although, the method of detecting motion between a first field and a second field 409 may vary, the preferred method of testing for inter-field motion is shown in FIG. 6. Detecting whether there is motion between a first field and a second field 409 includes the steps of: finding the edge orientation of the pixel of interest in the second field from a cross pair in the first field 410, predicting the value of the pixel of interest in the second field 416 based on the edge orientation of the pixel of interest in the second field, and comparing the predicted value of the pixel of interest in the second field to the actual value of the pixel of interest in the second field 418.

Referring to FIG. 6, the first step for determining whether there is motion between a first field and a second field 409 is finding the edge orientation of the pixel of interest 410 using data from the first field. Referring to FIG. 5, the method of finding the edge orientation of a pixel of interest 424 in the second field can be more clearly seen. In determining the edge orientation of the pixel of interest 424 located between scan lines 422a and 422b, the cross pairs are tested. The pixel cross pairs the cross pairs corresponding to the pixel of interest in the first field along the first scan line 422a and the second scan line 422b. Thus for the example shown in FIG. 5, the cross pairs are defined by x(k) and y(−k) where k=−N, ..., 0, ... N. For the representation shown in FIG. 5, the cross pairs are shown for N=4.

The number of cross pairs that are compared is preset, preferably with a value N=3, dependent upon a balancing between the accuracy desired and the increase in computational complexity. Although increasing the number of cross pairs tested increases the accuracy of the edge orientation, each increase greatly increases the computational complexity.

Assuming constant direction between scanned in field lines, the edge orientation of a pixel in the first field has the same edge orientation as a pixel in the second field. Thus, the edge orientation of a pixel in the second field, can be using data from the first field. The edge orientation for the pixel of interest is the minimum value of $|x(k)-y(-k)|$ where k=−N, ..., 0, ... N indicates the number of cross pairs that are compared.

For the example shown in FIG. 5, the edge orientation value between cross pairs x(−1) and y(1) is equal to |0−(−100)|=100, the value between cross pairs x(0) and y(0) is equal to |0−100|=100, and the value between x(1) and y(−1) is equal to |100−(100)|=0. Thus, for the example shown in FIG. 6 the minimum edge orientation value of $|x(k)-y(-k)|$ is found between pixel cross pairs x(1) and y(−1). Thus, the edge orientation of the pixel of interest is found between cross pairs x(1) and y(−1).

Referring to FIG. 6, preferably after finding the edge orientation of the pixel of interest 410, the edge orientation estimate is checked to see if it was successful 412. Typically, the orientation estimate is considered to be successful if the minimum value of $|x(k)-y(-k)|$ is found to be less than a predetermined threshold value. If the edge orientation estimate is not successful 413, then the value of the pixel in the second field is replaced with the average of the vertically aligned pixel cross pairs x(0) and y(0) in the first field. If the edge orientation estimation is successful 415, then the next step in finding whether motion has occurred between a first field and a second field, is the step of using the edge orientation to predict the pixel value 416 of the corresponding pixel in field 2 (the auxiliary field).

Knowing the edge orientation, a value of P is predicted 416 (equivalent to directional interpolation) using the cross pairs which result in a minimum value. The predicted value of P is equal to the pixel values of $[x(k)_{min}+y(-k)_{min}]/2$, where $x(k)_{min}$ and $y(-k)_{min}$ are the cross pairs along the edge orientation that result in the minimum value of $|x(k)-y(-k)|$. Thus for the example given in FIG. 6, the predicted value is equal to [100+100]/2=100.

After the step of using the edge orientation of field 1 pixels to predict the value of the pixel of interest in field 2 (step 416), the predicted value of the pixel in field 2 is compared to the actual value of the pixel in field 2 (step 418). The comparison of the actual pixel value (z) of pixel 424 to the predicted pixel value (p2) is made with reference to a predetermined value (T) in step 420 to determine whether motion has occurred. Thus if the difference between the actual pixel value and the predicted pixel value (|z-p2|) is less than the predetermined value T, then it is determined that no motion has occurred 420. However, if the difference between the actual value of the pixel value and the predicted pixel value is more than the predetermined threshold value T, then it is determined that motion has occurred and the pixel value of field 2 is replaced. Referring to FIG. 4, if it is determined that there is no inter-field motion 434, then the actual value of the pixel in the second field is unaltered 436. However, if it is determined that there is inter-field motion 432, then the value of the pixel in field two is replaced by the predicted pixel value.

Referring to FIG. 3, if it is determined that no motion between field 1 and field 2 has occurred 432, then the pixel value of the field 2 pixel is unaltered 436 thus indicating a stationary region. If it is determined that motion between the first field and the second field has occurred 434, then the pixel value of the second field will be replaced 438. The replacement value is typically either a value estimated using motion estimation or the predicted value of the second field.

Figure 7A:
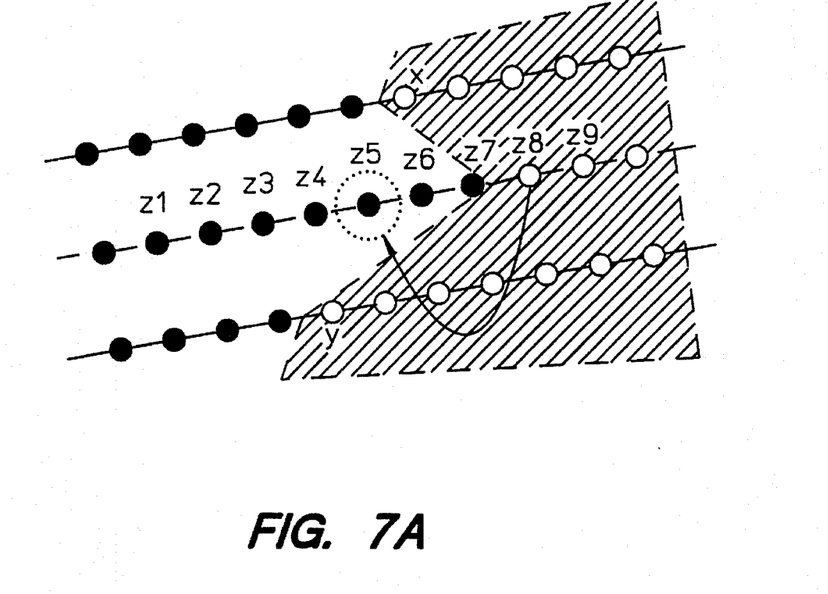
FIG. 7A shows a representation of a pixel of interest in the case where there is motion.
Figure 7B:
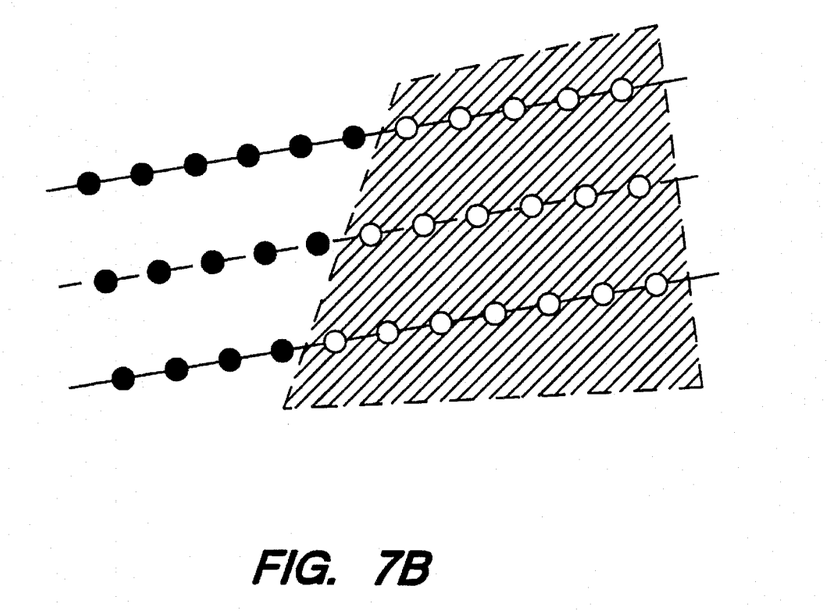
FIG. 7B shows a representation of a pixel of interest in the case where there is no motion.
Figure 8:
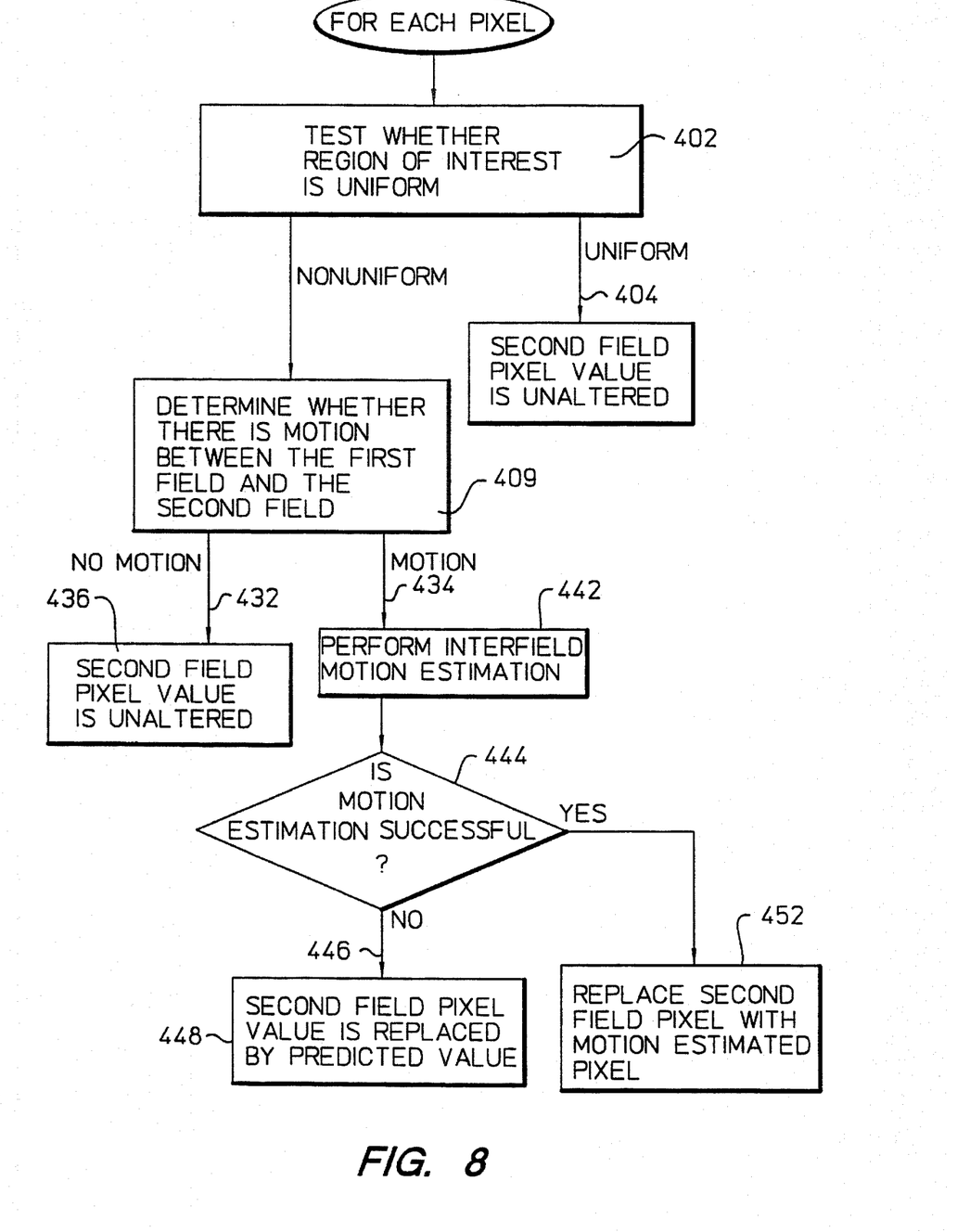
FIG. 8 shows a flow chart of the steps for converting an interlaced scanned video input to a progressive format according to an alternative embodiment of the present invention.

FIG. 7A shows a representation of a pixel of interest in the case where there is motion of an object between a first field and a second field. FIG. 7B shows a representation of a pixel of interest in the case where there is no motion. FIG. 8 shows a flow chart of the steps for converting an interlaced scanned video input to a progressive format according to an alternative embodiment of the present invention. The embodiment shown in FIG. 8, is similar to that shown in FIG. 4 except for those steps after the determination that there is motion between the first field and the second field 409. In the alternative embodiment shown in FIG. 8, instead of replacing the value of the pixel in the second field with the predicted value $[x(k)_{min}+y(k)_{min}]/2$ where $x(k)_{min}$ and $y(-k)_{min}$ are the cross pairs along the edge orientation that results in a minimum value of $|x(k)-y-k)|$, the value of the pixel in the second field is replaced with a motion estimated value.

Motion estimation replaces the value of the pixel of interest with a motion estimated value. For example, if the pixel z(5) in FIG. 7A moves to position z(8), then pixel z(5) would be replaced with pixel z(8). Motion estimation, while often offering superior results, is computationally complex and may not be used. The choice of using motion estimation is dependent on the desired tradeoff between image quality and system complexity.

Note that from FIG. 8 that motion estimation may not produce an accurate pixel displacement. This situation can occur due to limitations of the motion estimation procedure such as the actual pixel displacement value is selected over the motion predicted value. If motion estimation is not successful 446, the value of the pixel in the second field is replaced by the predicted value $[x(k)_{min}+y(k)_{min}]/2$ of the pixel 448. If the motion estimation is successful 450, then the value of the pixel in the second field is replaced with the motion estimated pixel 452.

Typically the system and method described in FIGS. 3, 4 and 8 are used to convert a video frame from an interlaced format to a progressive format, However, dependent on the application, only the method of determining inter-field motion shown in FIG. 6 may be needed. For example, the method for determining whether or not there is inter-field motion may simply be used to determine whether a video frame is stored in an interlaced or progressive format. This is based on the assumption that a video frame stored in a progressive format will have no inter-field motion between the first field and the second field which is in contrast to a video frame stored in interlaced format.

Obviously, there is not inter-field motion between the fields for every pixel in a video frame. Thus, the step of determining whether or not the video frame is stored in an interlaced or progressive format is done in a first embodiment after the entire video frame is scanned. Alternatively, if inter-field motion is found, then it can be assumed that the frame is stored in progressive format, and the entire video frame need not be checked for inter-field motion. Thus each pixel in the image need not be tested for inter-field motion. Alternatively, a single pixel of interest may be tested.

The method used for determining whether inter-field motion has occurred or for converting a digital image from an interlaced format to a progressive format may be used with either black and white or color images. System performance is independent of the image color space format such as RGB or YUV. However, for color images, each channel is deinterlaced independently.

It is understood that the above description is intended to be illustrative and not restrictive. The scope of the invention should therefore not be determined with reference to the above description, but instead should be determined with reference to the appended claims, along with the full scope of equivalents to which such claims are entitled. The scope of the invention should therefore not be determined with reference to the appended claims, along with the full scope of equivalents to which such claims are entitled.

What is claimed is:

1. A method of testing for a pixel of interest in a second field whether motion has occurred between a first field and the second field of an image represented by a plurality of pixels, the method including the steps of:

finding the edge orientation of a pixel of interest in the second field from a pixel cross pair in the first field;

based on the edge orientation of the pixel cross pair in first field, predicting the value of the pixel of interest in the second field; and comparing the predicted value of the pixel of interest in the second field to our actual value of the pixel of interest in the second field.

2. The method recited in claim 1 wherein finding the edge orientation of the pixel cross pair in the first field includes the steps of: finding a minimum value of $|x(k)-y(-k)|$ where $x(k)$ is representative of the value of a pixel at location (k) in the first field along a first scan line and $y(-k)$ is representative of the value of a pixel at location (-k) in the first field along a second scan line.

3. The method recited in claim 2, wherein the predicted value of the pixel of interest in the second field is equal to the average of the values of $x(k)$ and $y(-k)$, where $x(k)$ and $y(-k)$ are the pixel cross pair values which give a minimum value of $|x(k)-y(-k)|$ where k is equal to $-N, \ldots, 0, \ldots N$.

4. The method recited in claim 1, wherein the predicted value of the pixel in the second field is compared to the actual value of the pixel in the second field by taking the difference between the predicted value of the pixel in the second field and the actual value of the pixel in the second field.

5. The method recited in claim 1, wherein no motion between the first field and the second field has occurred if the absolute value of the difference between the predicted value of the pixel in the second field and the actual value of the pixel in second field is less than a predetermined threshold value.

6. The method recited in claim 5, wherein the value of the pixel of interest in the second field is not altered.

7. The method recited in claim 1, wherein motion between the first field and the second field has occurred if the absolute value of the difference between the predicted value of the pixel in the second field and the actual value of the pixel in second field is greater than a predetermined threshold value.

8. The method recited in claim 2, further including the step of determining whether the step of finding the edge orientation of the pixel of interest in the second field was successful.

9. The method recited in claim 8, wherein x(k) is representative of the value of a pixel at location (k) in the first field along a first scan line and y(−k) is representative of the value of the pixel at location (−k) in the first field along a second scan line, wherein the step of determining whether the edge orientation was successful includes the step of comparing the minimum value of |x(k)−y(−k)| to a predetermined threshold value, wherein the edge orientation determination is deemed successful if the minimum value of |x(k)−y(|k)| is less than or equal to the predetermined threshold value and is deemed unsuccessful if the minimum value of |x(k)−y(−k)| is greater than the predetermined threshold value.

10. A method of converting an interlaced scanned image to a progressive scanned image, the method including the steps of:

finding the edge orientation of a pixel of interest in a second field from a pixel cross pair in a first field;

based on the edge orientation of the pixel cross pair in first field, predicting the value of the pixel of interest in the second field; and comparing the predicted value of the pixel of interest in the second field to an actual value of the pixel of interest in the second field, wherein the value of the pixel of interest in the second field is unaltered if the absolute value of the difference between the predicted value and the actual value of the pixel of interest is less than a first predetermined threshold value and further wherein the value of the pixel of interest in the second field is replaced if the absolute value of the difference between the predicted value and the actual value of the pixel of interest is greater than the first predetermined threshold.

11. The method recited in claim 10 wherein the actual value of the pixel of interest in the second field is replaced with the predicted value of the pixel in the second field.

12. The method recited in claim 10 further including the step of performing motion estimation.

13. The method recited in claim 12, wherein if the motion estimation step was successful, the actual value of the pixel in the second field is replaced with a motion estimated pixel value.

14. The method recited in claim 12, wherein if the motion estimation is unsuccessful, the actual value of the pixel in the second field is replaced by a predicted value of the pixel in the second field.

15. The method recited in claim 10 further including the step of determining whether a region of interest is uniform, wherein the step of determining whether the region of interest is uniform occurs before the step of finding the edge orientation.

16. The method recited in claim 14 wherein the step of determining whether the region is uniform includes the step of comparing the absolute value of the difference between the pixel of interest and the corresponding pixel cross pair to a second predetermined threshold value.

17. The method recited in claim 10 wherein finding the edge orientation of the pixel cross pair in the first field includes the steps of: finding a minimum value of |x(k)−y(−k)| where x(k) is representative of the value of a pixel at location (k) in the first field along a first scan line and y(−k) is representative of the value of a pixel at location (−k) in the first field along a second scan line.

18. The method recited in claim 17, wherein the predicted value of the pixel of interest in the second field is equal to the average of the values of x(k) and y(−k), where x(k) and y(−k) are the pixel cross pair values which give a minimum value of |x(k)−y(−k)| where k is equal to −N, . . . , 0, . . . N.

19. The method recited in claim 10 further including the step of determining whether the edge orientation of the pixel in the first field was successful.

20. The method recited in claim 19 wherein the the edge orientation is deemed to have been found successfully if the minimum value of |x(k)−y(−k)| is less than a threshold value.

* * * * *

UNITED STATES PATENT AND TRADEMARK OFFICE
CERTIFICATE OF CORRECTION

PATENT NO.    : 5,532,751
DATED         : July 2, 1996
INVENTOR(S)   : Sam Lui It is certified that error appears in the above-identified patent and that said Letters Patent is hereby corrected as shown below:

Column 6,
Line 48, delete "our actual" and insert therefor -- an actual --

Signed and Sealed this

Twenty-fifth Day of May, 2004

JON W. DUDAS
*Acting Director of the United States Patent and Trademark Office*